Dec. 22, 1953          T. LAHONEN          2,663,464

DISPENSER FOR POISON GRAIN AND THE LIKE

Filed Jan. 7, 1950          2 Sheets-Sheet 1

INVENTOR
TOIVO LAHONEN
BY
Richard P. Cardew
AGENT

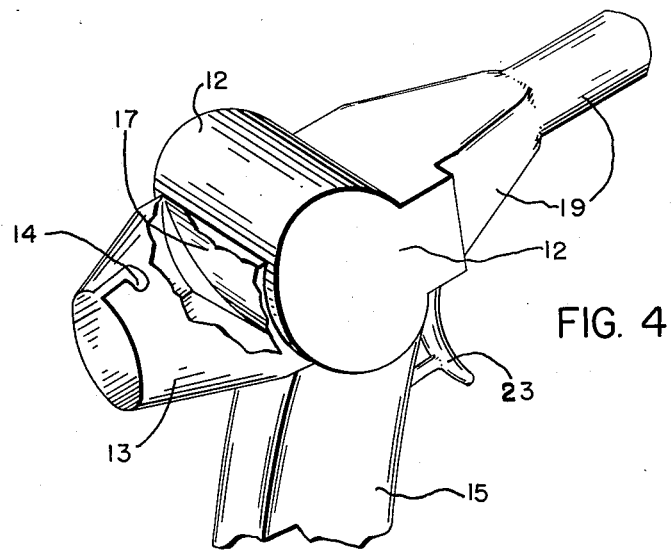
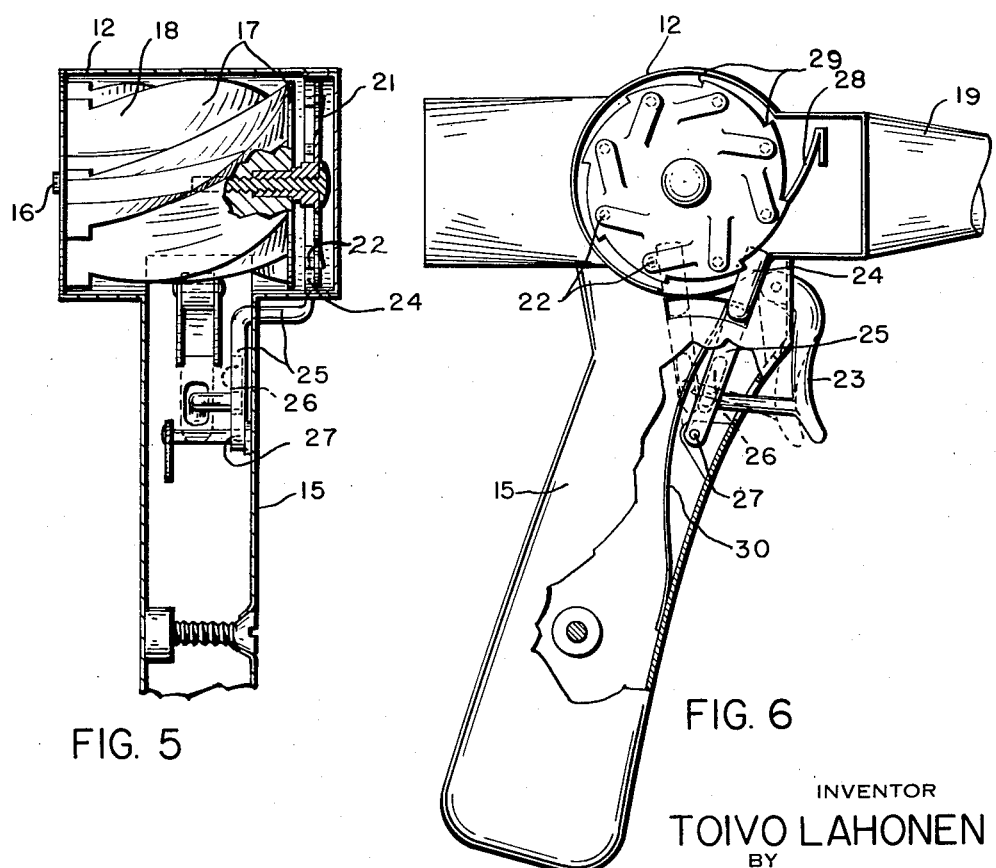

Patented Dec. 22, 1953

2,663,464

UNITED STATES PATENT OFFICE 2,663,464

DISPENSER FOR POISON GRAIN AND THE LIKE

Toivo Lahonen, The Pas, Manitoba, Canada, assignor of one-half to Leonard W. Bennett, Port Arthur, Ontario, Canada Application January 7, 1950, Serial No. 137,319

1 Claim. (Cl. 222—360)

This invention relates to a dispensing device, and has special reference to a portable device which permits the deposit of predetermined amounts of granular material as desired. The instant invention lends itself admirably to the placing of poison grain, or the like, adjacent to, or within, the entrance of gopher holes, and other places where pests are likely to contact same for consumption.

In the past, farmers, who were pestered with gophers in their fields, would mix a little poison in a pail of grain, using a spoon or the like to stirr and mix the poison into the grain. They would then take the pail of poison grain and spoon and walk through the fields, bending over at each gopher hole, and place a spoonful of the poisoned mixture in the desired location adjacent to, or in, the hole.

The poison used for killing pests like gophers is also harmful to humans, and it is deemed obvious that there was always a danger that the person who mixed the poison and handled the mixture might, himself, become at least ill from the contact with the grain in the above manner. The pail and spoon were awkward to handle, and dispensing required a great deal of stooping and bending. This method was always considered a drudge, resulting in its never being done effectively.

It is, therefore, one of my principal objects to provide a device for dispensing poisonous granular materials in a convenient manner, and to provide convenient portability for such a device.

Another object is to provide a container for mixing and carrying the poison and granular material, such as grain, which insures against one's contacting the poisoned mixture either during the mixing or carrying of the latter.

Another object is to provide a gun-type dispenser which permits the operator to deposit a predetermined amount of poisoned material in any desired location without bending or stooping, regardless of the height of the operator. The gun-type dispenser is also an inducement, particularly to juniors, to perform this task properly since it becomes fun, instead of a drudge.

Another object is to provide convenient means for carrying the dispensing device, the mixer-container being carried on the back, and properly secured by an arrangement of carrying straps.

These and other objects and advantages will become more apparent as the description of the invention proceeds.

In the accompanying drawing:

Fig. 4 is an enlarged broken perspective view of the gun member from the rear.

Fig. 5 is an enlarged vertical sectional view on the line 5—5, Fig. 2.

Fig. 6 is an enlarged broken side elevational view of the gun.

Figure 3:
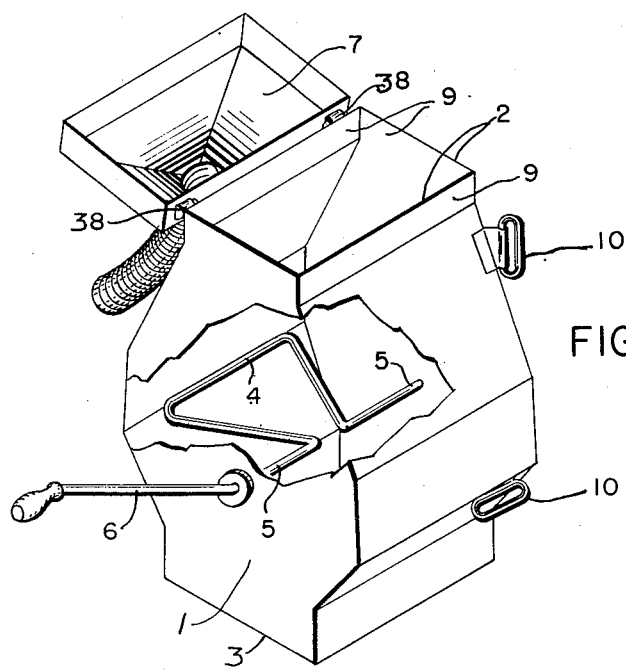
Fig. 3 is a broken perspective view of the container member in mixing position with the closure member in open position.

In the drawing, the reference numeral 1 indicates the container member of my device, which may be made of sheet metal, plastic, or the like, and has one open end 2, which is shown in Fig. 3. The end 3, opposite the open end, is flat to provide a base on which the container may stand when the latter is in inverted, or mixing, position. Within the container, a mixing paddle 4 is rotatably carried, the ends 5 of the paddle being supported in suitable openings in the walls of the container, as shown. One end of the paddle extends out of the container and a crank 6 is provided thereon to provide means to rotate the paddle within the container to mix the grain and poison together properly.

It is deemed apparent that a quantity of grain and poison can be mixed together by turning the crank 6, and with the closure 7 in place, there is no danger of contacting the material in the container. The whole may then be hung upside down in a safe place until any excess moisture will have been absorbed.

Figure 1:
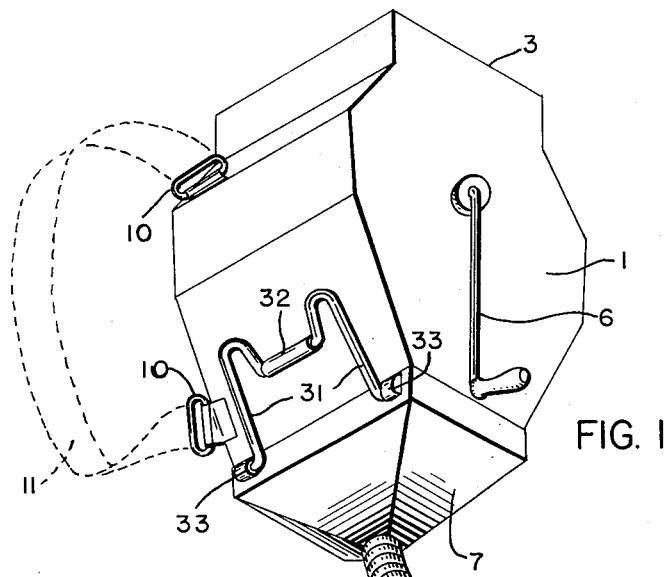
Fig. 1 is a perspective view of the mixer-container member of my device in carrying position.
Figure 2:
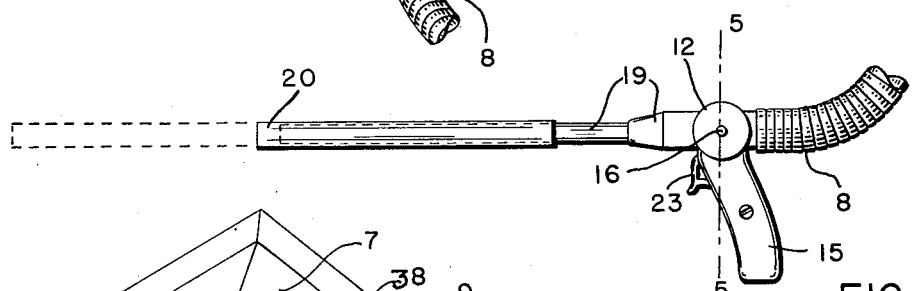
Fig. 2 is a side elevational view of the gun-like dispensing member of my device.

The closure 7 is provided for the open or bottom end of the container 1, and is hinged to one side of the opening as at 38. The closure is preferably made to overlap the collar 9 around the upper end of the container so that when the container is in position for carrying and dispensing poison material, there will be no leakage of the material from around the edges of the closure. The closure is preferably pyramidal in shape so as to form a funnel-like bottom for the container when the latter is in carrying position as shown in Fig. 1. This will insure the poison material being concentrated in the bottom of the container for dispensing. Centrally of the closure or bottom 7, a length of flexible tubing 8 is secured, there being an opening, of course, through the bottom 7 to permit the material to flow into and through the tube 8 by gravity. It is deemed apparent that granular material within the container will readily leave the latter and flow through the tube 8 as the constant shaking of the container will keep the mixture loose when one walks with same. Means for holding the closure firmly over the open end of the container may comprise a spring clip 31, pivotally secured to the container as at 32, the ends of the clip being sprung into eyes 33 on the closure, as shown, or by other suitable means.

Suitable receivers 10 are provided on the container to permit any desired strap arrangement 11 to be used for convenience in carrying the mixer-container on one's back when using same.

At the end of the tube, a trigger operated dispensing gun is carried, clearly illustrated in Figs. 2, 4, 5, and 6.

The gun comprises a housing 12 having a shank 13 to which the tube 8 may be removably secured. One means for securing the tube to the shank 13 is a pin, not shown, which may be carried on the tube, and engaged in the bayonet slot 14 to hold the tube assembled with the gun. A handle 15 is provided on the housing 12 to facilitate the operating of the gun and to house the trigger mechanism.

The housing 12 is preferably cylindrical, as shown and has a shaft 16 extending thereinto. An impeller 17 is carried on the shaft 16, and fills the major portion of the housing. The impeller comprises, preferably, a plurality of vanes 18 mounted spirally on or with said shaft. The impeller extends across the housing where all poison material entering the housing from the tube 8 will engage same and be stopped, filling the spaces between the vanes.

In order for the poison material to pass the impeller, the latter must be rotated, thereby drawing a predetermined amount of the material around through the housing where it will fall into and through the discharge tube 19 which extends from the housing opposite the shank 13. The discharge tube may be of any desired length, however, for convenience, the tube may be provided with a telescopic section 20 to permit selectivity with respect to the tube length.

The impeller may be rotated in any suitable manner, however, as here shown, a disc 21 is provided on the shaft 16 adjacent the impeller, the disc having a plurality of lugs 22 extending therefrom. It is deemed apparent that said lugs may extend from the impeller if desired. A trigger 23 is pivotally carried on the upper end of the handle 15, and a pawl 24 is operated by the trigger to engage the lugs as the trigger is pulled to rotate the disc 21, shaft 16, and impeller 17 a predetermined distance to move a predetermined amount of the posionous mixture through the housing and release same to fall through the discharge 19—20. The pawl 24 is linked to the trigger by an extension 25, preferably of L-shape, into the trigger handle, there being a sliding connection 26 between the trigger and the extension, and the extension being pivotally attached to the handle 15 as at 27. A spring catch 28 is provided to engage the notches 29 to prevent reverse rotation of the impeller, and a spring 30 is provided in the handle 15 to return the trigger and pawl to normal position for operation to rotate the impeller.

It is deemed apparent, from the above, that one may readily deposit any desired amount of poisonous mixture in any desired location on the ground near, or inside the burrow of a pest, without contacting same by hand, and without bending or stooping.

Variations in the amount of grain distributed, for any purpose desired, may be made by changing impeller units 17 which are particularly designed for discharging particular amounts, or particular types of grain. For example, corn will require a different impeller construction than will wheat, and, of course, the lugs 22 will vary in accordance with the type of impeller used so that the latter will be rotated the required distance with each trigger pull.

Having thus described my invention, what I claim is:

A device for dispensing a poisonous granular mixture consisting essentially of a container for said mixture, a gun having a housing, a flexible connection from said container to said housing, a rotatable impeller within said housing and blocking the path of said mixture therethrough, a discharge tube extending from said housing to convey the mixture from said gun to a discharge point, said impeller comprising a shaft mounted across said housing and a plurality of spiral vanes extending radially from said shaft to substantially fill and block said housing whereby said mixture is lodged between said vanes when it enters said housing and is carried through said housing between said vanes when said impeller is rotated, and means to rotate said impeller step by step in predetermined increments to release a predetermined quantity of said mixture from between said vanes to pass into said discharge tube, said means comprising a plurality of lugs on said impeller, a pawl to engage said lugs, and a trigger to operate said pawl and cause said impeller to be rotated within said housing a predetermined increment each time it is operated.

TOIVO LAHONEN.

References Cited in the file of this patent

UNITED STATES PATENTS

| Number | Name | Date |
|---|---|---|
| 261,771 | Senn | July 25, 1882 |
| 337,312 | Dodds et al. | Mar. 2, 1886 |
| 714,051 | Spitzenberg | Nov. 18, 1902 |
| 952,252 | Ingram | Mar. 15, 1910 |
| 977,115 | Markley | Nov. 29, 1910 |
| 2,239,464 | Moger | Apr. 22, 1941 |

FOREIGN PATENTS

| Number | Country | Date |
|---|---|---|
| 11,117 | Great Britain | Mar. 5, 1846 |